United States Patent [19]

Peck

[11] 4,168,411

[45] Sep. 18, 1979

[54] CLOSURE SWITCH FOR A COMPARTMENT

[75] Inventor: Vincent W. Peck, Waltham, Mass.

[73] Assignee: TRW Inc., Cleveland, Ohio

[21] Appl. No.: 822,460

[22] Filed: Aug. 8, 1977

[51] Int. Cl.² .............................................. H01H 3/16
[52] U.S. Cl. ................................ 200/61.62; 200/61.7;
362/80; 362/155
[58] Field of Search ........................ 16/179, DIG. 13;
200/61.62, 61.64, 61.67, 61.68, 61.7, 61.81,
61.82, 61.58 B, 159 R, 295, 296, 339; 362/75,
61, 80, 295, 306, 362, 365, 94, 155, 802, 154

[56] References Cited

U.S. PATENT DOCUMENTS

| | | | |
|---|---|---|---|
| 2,408,157 | 9/1946 | Adams | 200/159 R |
| 2,615,083 | 10/1952 | Krueger | 200/61.68 |
| 2,734,992 | 2/1956 | Elliott et al. | 200/61.62 X |
| 2,816,972 | 12/1957 | Haut | 200/61.62 |
| 3,048,674 | 8/1962 | Hopkins | 200/61.7 |
| 3,157,756 | 11/1964 | Close et al. | 200/155 R X |
| 3,193,673 | 7/1965 | Herring et al. | 362/80 |
| 3,393,281 | 7/1968 | Basso | 200/61.62 |
| 3,440,373 | 4/1969 | Blewitt, Jr. | 200/61.7 |
| 3,553,448 | 1/1971 | Davis et al. | 362/80 |
| 3,576,409 | 4/1971 | Fiddler | 362/80 X |
| 3,609,265 | 9/1971 | Garbe et al. | 200/61.62 |
| 3,692,992 | 9/1972 | Bain et al. | 200/61.62 X |
| 3,833,781 | 9/1974 | Rumpf | 200/61.58 B |
| 3,944,766 | 3/1976 | Wood | 200/159 R X |

Primary Examiner—James R. Scott
Attorney, Agent, or Firm—James R. O'Connor; Martin J. O'Donnell; Thomas C. O'Konski

[57] ABSTRACT

A closure switch operates a bulb responsive to the opening and closing of a compartment lid. A bracket carries the switch including three contacts and a hinge, and a striker for a lid latch. The hinge is pivoted from a first to a second position by the latch upon lid closure. The first contact includes an end for connection into an electrical circuit and another end that connects to one bulb contact. The second contact includes an end for connection to ground and another end biasing the hinge into its first position. The third contact includes an end connecting to another bulb contact and another end engaging the second contact to energize the bulb when the lid is open and the hinge is in its first position. Upon lid closure the hinge pivots to its second position disengaging the second and third contacts to de-energize the bulb.

18 Claims, 7 Drawing Figures

CLOSURE SWITCH FOR A COMPARTMENT

BACKGROUND OF THE INVENTION

1. Field of the Invention

This invention relates generally to switches and, more particularly, to a switch that is adapted for use with a compartment having an access opening closable by a closure member and that is activated in response to the opening and closing of the compartment by the closure member. The switch is particularly adapted for use with storage compartments of the type found in automotive vehicles to control the energization of a lamp bulb used to illuminate the compartment.

2. Description of the Prior Art

Closure activated switches are presently used in a variety of fields including, for example, automotive vehicles, domestic appliances and alarm and anti-theft systems. In a typical prior construction, the switch includes a pushbutton or plunger that is biased by a spring into a protruding position and that is disposed so as to be depressed against the action of the spring upon the closing of the closure member. The plunger operatively engages other components within the switch so that, when the plunger is depressed, an electrical circuit through the switch is either made or broken. Examples of prior closure activated switches are shown in the following U.S. Pat. Nos. 2,615,083; 3,048,674; 3,157,756; 3,193,673; 3,393,281; 3,432,634; 3,440,373; and 3,609,265.

For most applications, and particularly for automotive applications, it is important that the closure-activated switches be relatively economical to manufacture and install and, at the same time, durable in use. As can be appreciated from a review of the above patents, a major drawback of many prior switches is their relative complexity and relatively large number of operating parts. This complexity not only adds to the cost of manufacturing the switches, but also oftentimes increases the likelihood of their premature failure because of the number of parts that are susceptible to failure.

Another, more specific problem is often encountered with prior switches, particularly those of the type including a plunger that is depressed by a closure member. Generally, in such switches, the plunger must be depressed to a predetermined point before the switch is activated. Because of the nature of manufacturing conditions, particularly those in the automotive industry, the clearances between a closed closure member and a frame member associated therewith in which the switch is typically mounted are difficult to control. These clearances also in many cases vary during the life of a vehicle as a result of the numerous openings and closings of the closure member. If these clearances are, or become, too large, the switch is not activated when the closure member closes and the usefulness of the switch is defeated.

OBJECTS OF THE INVENTION

A primary object of the present invention is to provide an improved closure switch.

Another object of the invention is to provide an improved closure switch that includes relatively few operational parts, each of which is simplified, relatively inexpensive to manufacture and easy to assemble.

Another object of the invention is to provide a closure switch of the type described that includes a multipurpose member that serves as a bracket for mounting the switch relative to a closure member and for carrying the contact members of the switch, as a retainer for a lamp bulb controlled by the switch, and as part of a latching mechanism for latching the closure member in a closed position, thus eliminating the need for separate such components.

Another object of the invention is to provide a closure switch of the type described that is adapted to energize and de-energize the lamp bulb in response to the opening and closing, respectively, of the closure member.

Another object of the invention is to provide a closure switch of the type described that is activated by a latch carried by the closure member so as to insure that when the closure member is latched closed, the switch is properly activated.

Another object of the invention is to provide a combination switch and bracket assembly which greatly facilitates adjustment of a closure member, e.g., a door, relative to a frame member, e.g., a compartment, without the need for independently adjusting the switch to achieve a proper activation distance as is characteristic with plunger-type switches of the prior art. This object is achieved by common movement of both the switch and bracket during adjustment, thereby maintaining predetermined switch activation distance relative to the closure member.

Still another object of the invention is to provide a closure activated switch of the type described that is particularly adapted for use in conjunction with a storage compartment within an automotive vehicle.

SUMMARY OF THE INVENTION

Briefly, a closure switch fabricated in accordance with the invention includes a bracket that carries the remaining components of the switch and that mounts within a compartment closable by a closure lid. The bracket serves as a latch striker member that is engaged by a latch carried by the closure lid for retaining the lid in a closed position over the compartment. An arm projects from the bracket and is adapted to receive and retain a lamp bulb for illuminating the compartment. An integral or "living" hinge member also projects from the bracket and is disposed so as to be engaged by the lid latch and pivoted from a first to a second position in response to the closing of the lid.

A first contact member mounts to the bracket and includes a first end that serves as one terminal of the switch for connection into an electrical circuit and a second end that connects to one contact of the bulb. A second contact member is mounted to the bracket but in such a manner as to be electrically isolated from the first contact member. One end of the second contact member serves as the other terminal of the switch for connection into the circuit, while the other end is carried by the integral hinge member and is so disposed that it biases the hinge member into its first position. A third contact member includes a first end that connects to the other contact of the bulb and a second end that is so disposed that it is contacted by the second end of the second contact member when the hinge member is in its first position. Thus, when the closure lid is open and the hinge member is in its first position, the electrical circuit through the three contact members and the bulb is complete and the bulb is energized to illuminate the compartment.

When the closure lid is closed, however, the lid latch bears against the hinge member and pivots it to its second position. The hinge member, in turn, moves the second contact member away from the third contact member to open or break the electrical circuit through the bulb. The bulb is thus automatically de-energized when the lid is closed.

In a preferred embodiment of the invention, the bracket is fabricated as a one-piece molded plastic part. Because of the multiple functions of the one-piece bracket, there is no need to provide a separate mounting bracket for the switch, a separate retainer or housing for the bulb, or a separate latch striker member for the lid latch. The integral hinge member also eliminates the need for a separate pushbutton or plunger of the type found in prior switches. Additionally, the contact members are preferably fabricated from a spring metal material. The resiliency of the contact members is used to advantage to insure good electrical contact to the bulb and to bias the hinge member to its first position to insure that the bulb is always energized when the closure lid is open. Thus, separate spring members need not be included in the switch to serve these purposes.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF PREFERRED EMBODIMENT

Figure 1:
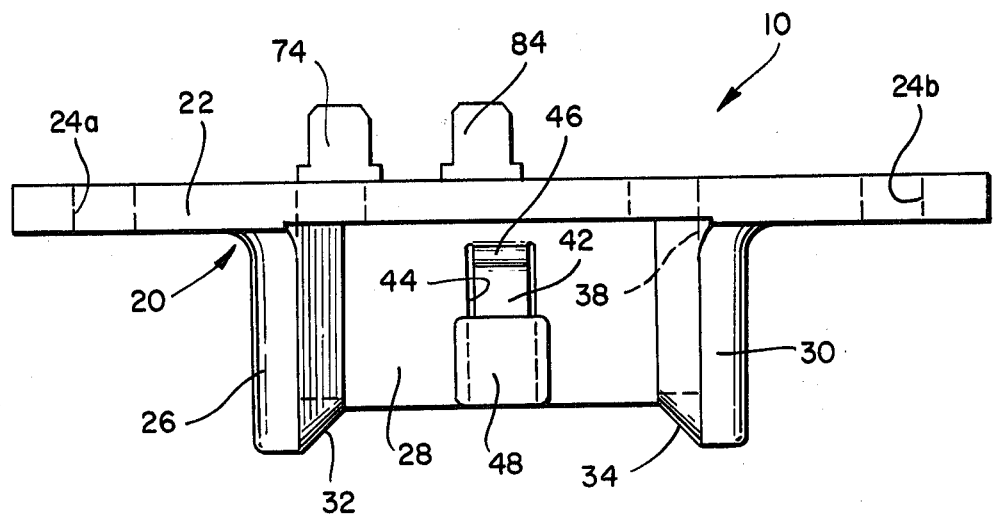
FIG. 1 is a front view of a closure switch embodying the invention.
Figure 2:
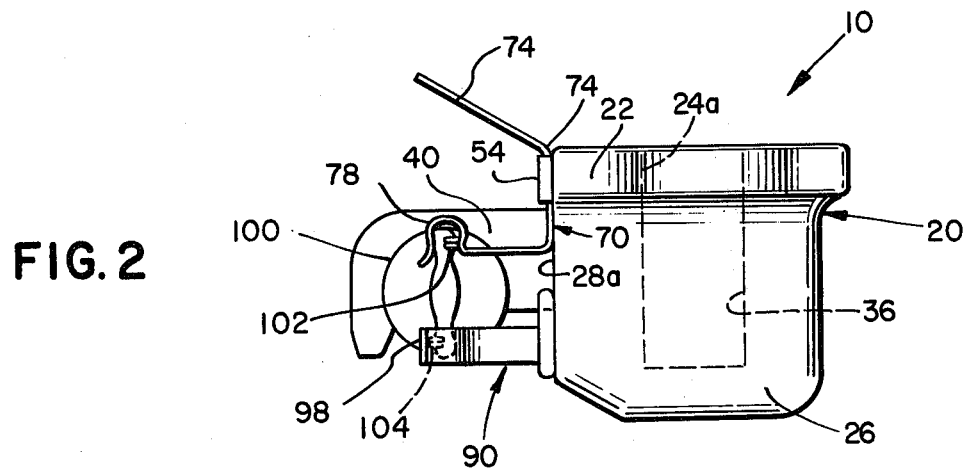
FIG. 2 is a side view of the switch of FIG. 1.
Figure 3:
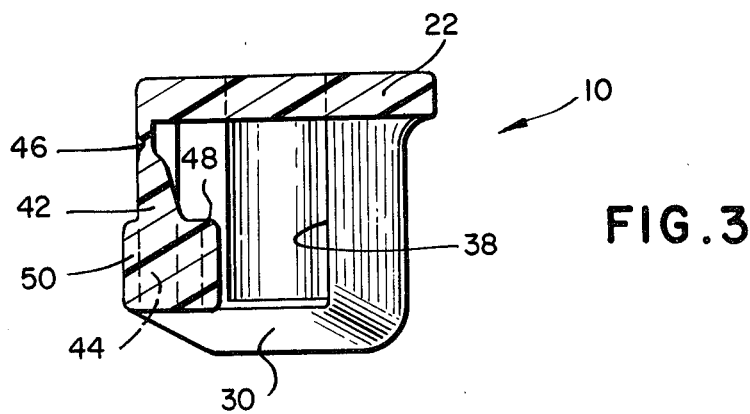
FIG. 3 is a side view in section of the switch of FIG. 1 which better illustrates a "living" hinge member formed on a bracket of the switch.
Figure 4:
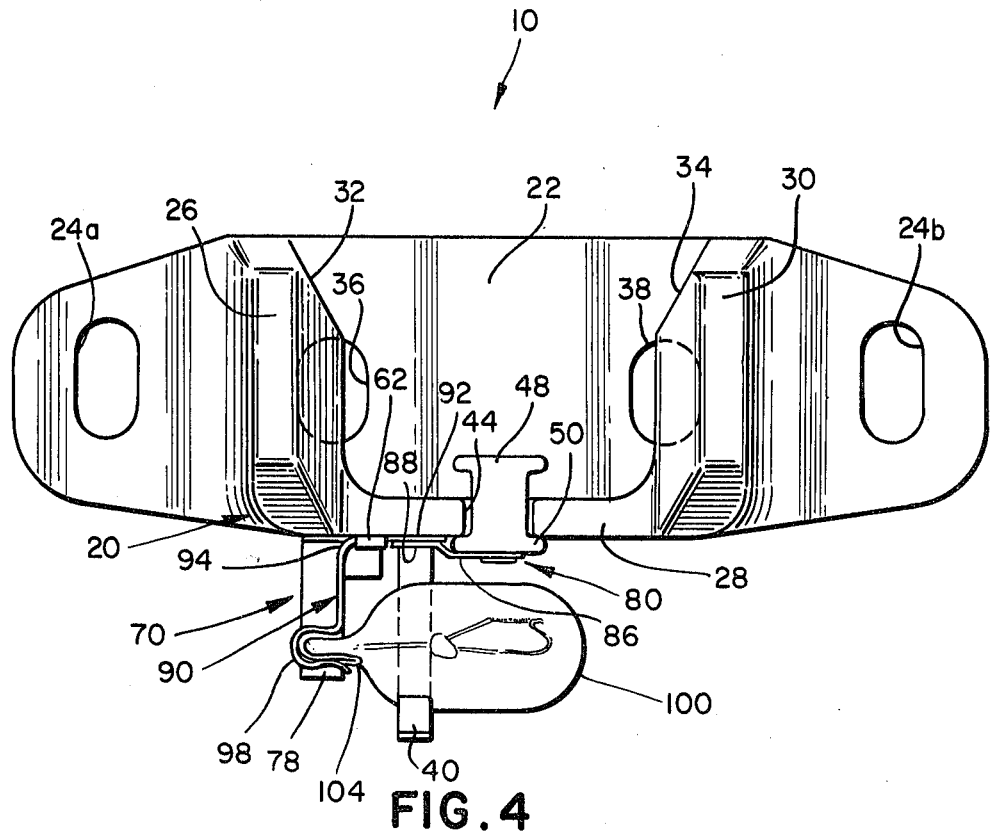
FIG. 4 is a bottom view of the switch of FIG. 1.
Figure 5:
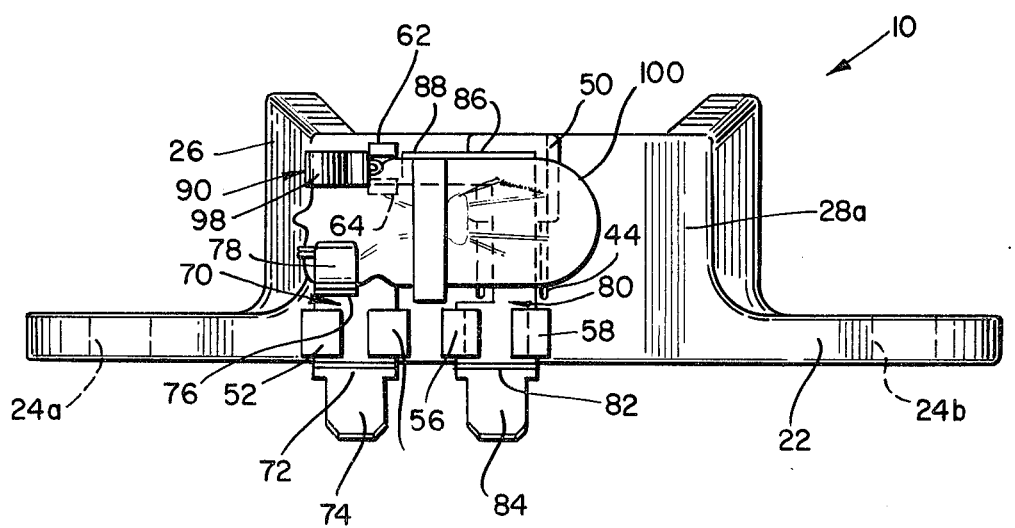
FIG. 5 is a rear view of the switch of FIG. 1.

Referring now to the drawing, and particularly to FIGS. 1-5 thereof, there is shown a closure switch embodying the invention and indicated generally by the reference numeral 10. The switch 10 comprises a bracket 20 and three contact members 70, 80 and 90, respectively (FIGS. 2, 4 and 5). The contact members 70, 80 and 90 are mounted to the bracket 20 and serve as the current carrying members of the switch 10. The bracket 20 is adapted to retain a lamp bulb 100, which is shown in FIGS. 2, 4 and 5, and which is energized and de-energized by activation of the switch 10.

Figure 6:
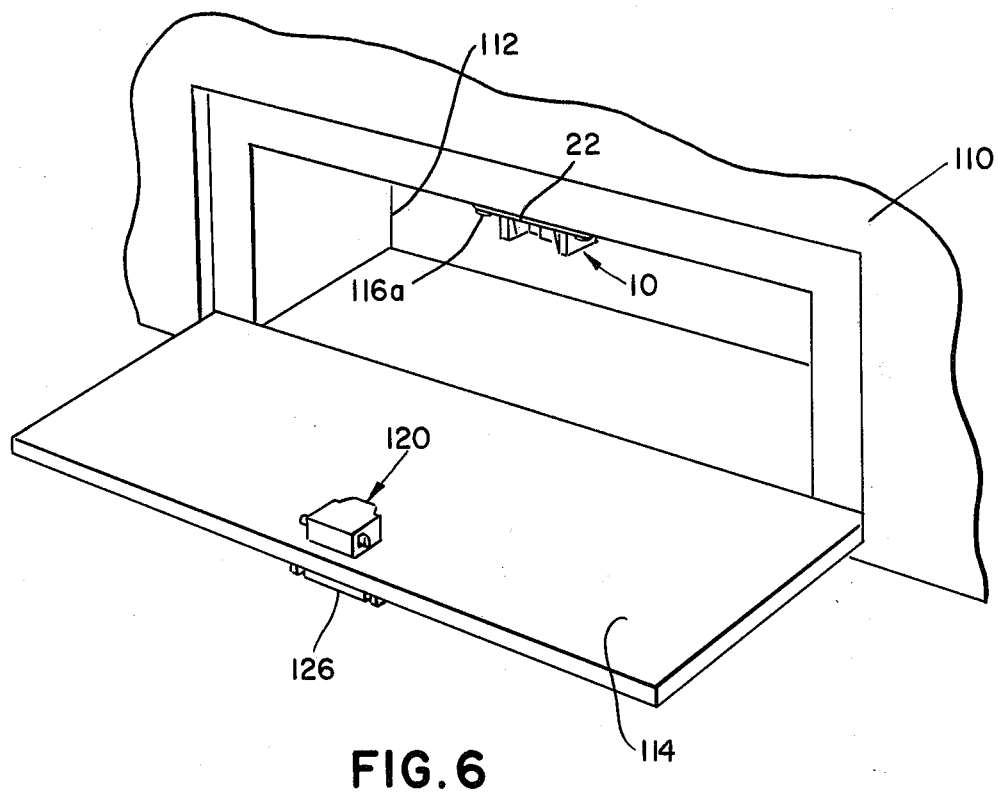
FIG. 6 illustrates a vehicle dashboard glove box compartment in which the switch of FIG. 1 is shown installed.

More specifically, the bracket 20, which is preferably fabricated from a moldable material such as a plastic, includes an upper, plate-like portion 22. A pair of holes 24a and 24b are provided through the respective ends of the portion 22. The portion 22 is adapted for mounting the bracket 20 and other components of the switch 10 carried thereby near the access opening of a compartment closable by a closure lid. As an example of a typical application of the switch 10, a portion of a vehicle dashboard 110 is shown in FIG. 6 of the drawing including a glove box compartment 112 having an access opening that is opened and closed by a closure lid 114 hinged to the dashboard along its bottom edge. The switch 10 is shown mounted within the compartment 112 in FIG. 6. The mounting is accomplished by securing the mounting portion 22 of the bracket 20 to an upper frame member in the compartment 112 using a pair of screws 116a and 116b that pass through the holes 24a and 24b. The switch 10 is mounted sufficiently close to the forward end of the compartment 112 so that it is operatively engaged by a latch 120 carried by the lid 114 when the lid is closed in a manner more fully described below.

Referring again to FIGS. 1-5, it can further be seen that the bracket 20 includes three, connected wall members 26, 28 and 30 that project downwardly from the mounting portion 22 and that define a generally rectangular structure that is open at the front and bottom. As can best be appreciated from FIG. 4 of the drawing, the wall members 26 and 30 are illustratively considerably thicker than the wall member 28 between them.

The front edge of each of the wall members 26 and 30 is tapered in thickness to define an inwardly directed bevel 32 and 34, respectively. Additionally, an elongated recess 36 and 38 is provided in and along the inside surface of each of the wall members 26 and 30, respectively. As explained more fully below, the bevels 32 and 34 and recesses 36 and 38 enable the wall members 26 and 30 to serve as a latch striker which is engaged by the latch 120 carried by the closure lid 114 to retain the lid 114 in a closed position over the compartment 112.

As best seen in FIGS. 2 and 4, a bulb retaining arm 40 projects outwardly from the rear surface 28a of the wall member 28. The arm 40 has the shape of a hook that opens downwardly and that is dimensioned such that it embraces and supports the bulb 100. The bulb 100 is illustratively a so-called capless or wedge-base bulb that includes a bulbous portion and base, both of which are integrally fabricated from glass. A pair of bulb filament wires 102 and 104, which extend at spaced-apart positions from the end of the bulb base, are looped and bent over opposed sides of the base and serve as the electrical contacts of the bulb 100. Electrical connection is made made to the bulb wires 102 and 104 by the contact members 70 and 90, respectively, in a manner described more fully below.

An integral or "living" hinge member 42 is formed in the center portion of the wall member 28. As best seen in FIGS. 1 and 3, a slot 44 is provided in the wall member 28 in which the hinge member 42 is disposed. The hinge member 42 connects to the wall member 28 by a connecting web 46 which is thinned down somewhat relative to the remainder of the hinge member 42 so as to facilitate pivotal movement of the hinge member in the slot 44 about the connecting web 46. The free, or lower end of the hinge member 42 has an I-bar shape including enlarged front and rear pads 48 and 50, respectively. The pads 48 and 50 are of larger area than the slot 44 and thus serve to limit the pivotal movement of the hinge member 42 in both directions and to avoid overstressing of the connecting web 46.

As shown in FIG. 5, the first contact member 70 is mounted to the rear surface 28a of the wall member 28 by a pair of opposed finger members 52 and 54. The finger members 52 and 54 project outwardly from the surface 28a and then laterally toward each other so as to overlap and hold the contact member 70 against the surface. The contact member 70 may be notched or necked down in the vicinity of the finger members 52 and 54, as indicated in FIG. 5, to prevent the contact member 70 from slipping relative to the surface 28a.

As best seen in FIG. 2, an outward bend 72 is made in the contact member 70 just above the finger members 52 and 54. The upper end 74 of the contact member 70 thus extends at an upward angle away from the surface 28a. This end 74 serves as one terminal of the switch 10 for connection into an electrical circuit, typically, to a wire from the positive side of the vehicle battery. Although not shown as such in the drawing, the terminal end 74 of the contact member 70 may be suitably configured to receive a snap-on wire connector.

Another outward bend 76 is made in the contact member 70 below the finger members 52 and 54. The lower end of the member 70 is further bent to form a loop 78 which is adapted to engage around one side of the base of the bulb 100 and to make contact with the bulb filament wire 102. As noted, the contact members 70, 80 and 90 are each preferably fabricated from a spring metal material having considerable resiliency. The loop 78 in the member 70 is so dimensioned that it resiliently grips the base of the bulb 100 and the wire 102. This helps prevent the loop 78 from disconnecting from the bulb 100 due to shocks or vibrations of the switch 10.

Referring again to FIG. 5, it can be seen that the second contact member 80 also mounts to the rear surface 28a of the wall member 28 to the left of the contact member 70 and at the center of the surface. A pair of opposed finger members 56 and 58, which are identical to the finger members 52 and 54, are used to secure the contact member 80 to the surface 28a. An outward bend 82 is made in the contact member 80 above the finger members 56 and 58 causing the upper end 84 of the member 80 to extend essentially parallel to the terminal end 74 of the contact member 70. The end 84 serves as the second terminal of the switch 10 for connection into the electrical circuit, typically, to ground. The terminal end 84 may also be suitably configured to receive a snap-on wire connector.

The contact member 80 extends below the finger members 56 and 58 along the rear surface of the hinge member 42 and into contact with the rear pad 50 thereof. Because of the resiliency of the member 80 and its position along the rear surface of the hinge member 42, it biases the hinge member 42 forwardly into the position shown in FIGS. 3 and 4.

The lower end of the contact member 80 includes a right angle extension 86 that extends laterally beyond one edge of the pad 50. As seen in FIG. 4, the free end 88 of the extension 86 is provided with an offset bend so that it extends inwardly of the plane of the rear face of the pad 50.

The third contact member 90 also mounts to the rear surface 28a of the wall member 28. A pair of finger members 62 and 64 (FIG. 5) are located just beyond (i.e., to the right) of the free end 88 of the contact member 80 and, like the finger members 52 and 54 and 56 and 58, overlap and hold the contact member 90 against the surface 28a.

One end 92 of the contact member 90 extends beyond the finger members 62 and 64 (i.e., to the left as viewed in FIG. 5) along the surface 28a to a position directly beneath the free end 88 of the contact member 80. When the hinge member 42 is in the position shown in FIG. 4, the end 92 of the member 90 and the end 88 of the member 80 are in physical and electrical contact.

An outward bend 94 is made in the member 90 on the opposite side of the finger members 62 and 64 (i.e., on the right thereof as viewed in FIG. 5). A loop 98 is then formed in the member 90 which, like the loop 78 in the contact member 70, is adapted to resiliently engage around one side of the base of the bulb 100 and make electrical contact to the filament wire 104. The loop 98 is different from the loop 78 in that the former engages over the rear end of the bulb base while the latter engages over a side edge thereof.

It can thus be seen that, when the hinge member 42 is in the position illustrated in FIG. 4, the ends 88 and 92 of the contact members 80 and 90, respectively, are in contact and the electrical circuit through the contact member 70, the bulb 100, the contact member 80 and the contact member 90 is complete. The bulb 100 is thus energized. The bulb 100 is de-energized by pivoting the hinge member 42 to the position illustrated in FIG. 7 of the drawing. This breaks the contact between the end 88 of the contact member 80 and the end 92 of the contact member 90 and consequently opens or breaks the electrical circuit and de-energizes the bulb 100. When the hinge member 42 is released, the contact member 80 biases the hinge member 42 back into the position illustrated in FIG. 4. The contact members 80 and 90 again contact each other and the bulb 100 is again energized.

Figure 7:
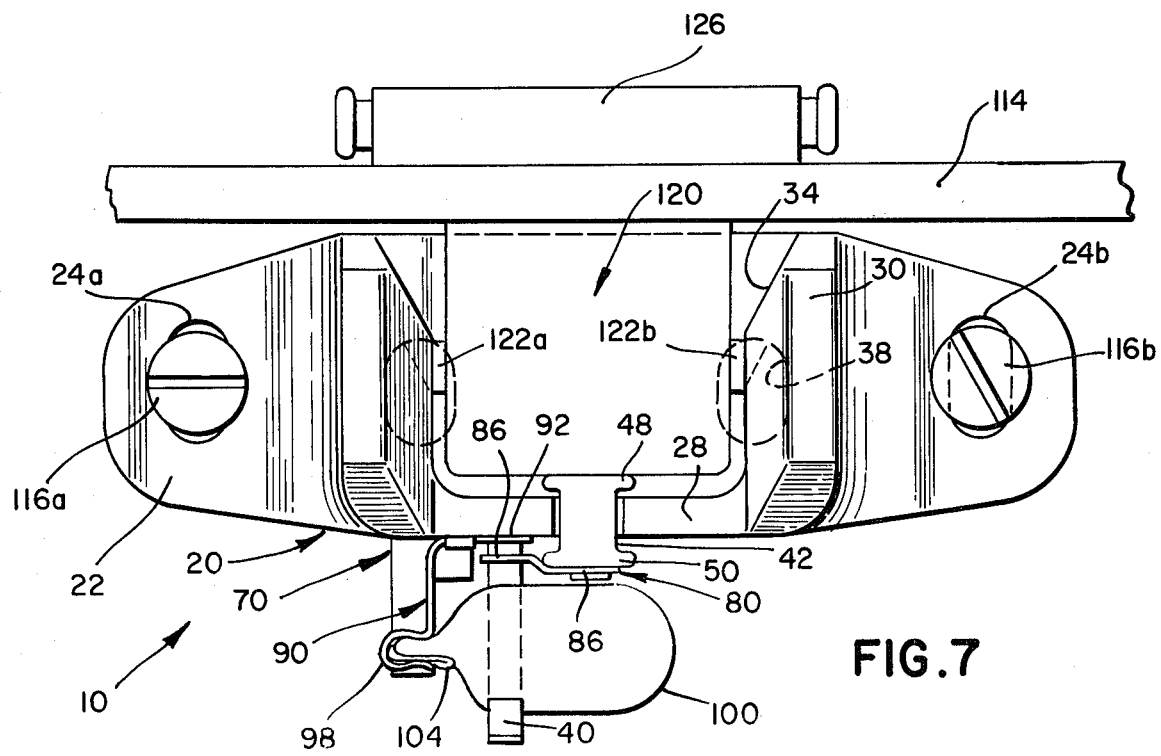
FIG. 7 is a bottom view similar to FIG. 4 but showing the condition of the switch when contacted by a latch on a closure lid.

FIG. 7 illustrates further details of the latch 120 shown in FIG. 6 and also illustrates the manner in which the latch 120 engages the wall members 26 and 30 on the bracket 20 and opens the switch 10 when the lid 114 is closed over the compartment 112. The latch 120 illustratively includes a pair of counter-extending latching bolts 122a and 122b that are retained within a latch casing 124 secured to the inside surface of the lid 114. A spring (not shown) inside the casing 124 biases the bolts 122a and 122b into a protruding position. The protruding ends of the bolts 122a and 122b are typically beveled, as indicated in FIG. 7, so that when the lid 114 is pushed closed, the bolts 122a and 122b engage against the bevels 32 and 34 on the wall members 26 and 30, respectively, and are inwardly forced against the action of the latch spring. When the lid 114 is fully closed and the bolts 122a and 122b clear the leading edge of the recesses 36 and 38 in the wall members 26 and 30, respectively, they snap back to a protruding position in the recesses to retain the lid 114 in a fully closed position. Typically, a latch releasing mechanism 126 is secured to the outside surface of the lid 114, the opposite ends of which can be squeezed to retract the latch bolts 122a and 122b when the lid 114 is to be opened.

It can be seen from FIG. 7 that when the lid 114 is latched closed, the latch casing 124 engages against the front pad 48 and pivots the hinge member 42 rearwardly. The hinge member 42, in turn, forces the end 88 of the contact member 80 away from the end 92 of the contact member 90. Thus, as long as the clearance between the lid 114 and the dashboard 110 is sufficient for the latch 120 to operate, the switch 10 will also be operated to de-energize the lamp bulb 100.

As should now be appreciated, the switch 10 has numerous attractive features. For example, the bracket 20 serves as a mounting bracket for the switch, as a retainer for the lamp bulb 100 and as a latch striker member, thus eliminating the need for separate such components. The integral hinge member 42 on the bracket 20 also eliminates the need for a separate pushbutton or plunger of the type found in most prior switches. Additionally, the resiliency of the contact members 70, 80 and 90 eliminates the need for separate springs for firmly retaining the bulb 100 and for biasing the hinge member 42 to a position to energize the bulb 100 when the lid 114 is opened.

Each of the component parts of the switch 10 are also particularly economical to manufacture. The bracket 20, for example, can be molded as an integral unit from plastic using an essentially one-step molding process, such as injection molding. The spring contact members 70, 80 and 90 can be stamped from a suitable spring metal stock, such as 12 mil spring steel, and mechanically bent to shape prior to assembly with the bracket 20.

Tests performed on the switch 10 indicate that it meets and exceeds automotive manufacturers' specifications for reliability and durability in use.

It should be understood that the above-described embodiment is intended to illustrate rather than limit the invention and that various modifications may be made thereto by those skilled in the art without departing from the scope of the invention as defined by the appended claims.

For example, it is not essential that the bracket 20 be adapted to retain the lamp bulb 100. Rather, the switch 10 can readily be modified to control a component, such as the lamp bulb 100, that is mounted in a location remote from the switch. The bulb retaining arm 40 may also be replaced by a member that is designed to receive and retain a conventional cap-base bulb of the type including a metal base formed over the end of a glass bulbous enclosure. The switch 10 may also be used with closure members other than the vehicle glove box closure lid 114 mentioned above. It is thus the object of the appended claims to cover these and such other modifications as come within the true spirit and scope of the invention.

What I claim as new and desire to secure by Letters Patent of the United States is:

1. A switch for mounting relative to a compartment having an access opening closable by a closure lid, the closure lid carrying means for latching the closure lid in a closed position, said switch being activated to energize and de-energize a lamp bulb for illuminating the compartment in response to the opening and closing, respectively, of the closure lid, said switch comprising:
   A. a bracket formed of an insulating material for mounting relative to the compartment and including
      i. a lamp bulb retaining portion for receiving and retaining the lamp bulb, and
      ii. a movable member connected to the bracket so as to be engaged by the latching means on the closure lid and moved from a first position to a second position in response to the closing of the closure lid;
   B. a first contact member mounted to said bracket and including
      i. a first portion for connection into an electrical circuit, and
      ii. a second portion for connecting to the bulb;
   C. a second contact member mounted to said bracket and including
      i. a first portion for connection into the electrical circuit, and
      ii. a second portion carried by and movable with said movable bracket member; and
   D. a third contact member mounted to said bracket and including
      i. a first portion for connecting to the bulb, and
      ii. a second portion contacted by the second portion of said second contact member when said movable bracket member is in its first position thereby to complete the electrical circuit through the bulb and energize the bulb, the second portion of said second contact member being movable away from the second portion of said third contact member when said movable bracket member is moved to its second position thereby to open the electrical circuit and de-energize the bulb.

2. The switch of claim 1 in which said bracket further includes
   i. a mounting portion for mounting said bracket relative to the compartment, and
   ii. a latch striker portion engageable by the lid latching means when the closure lid is moved to its closed position for retaining the closure lid in its closed position.

3. The switch of claim 2 in which the latching means is of the type including a latch casing secured to the inside surface of the closure lid, a pair of counter-extending latch bolts protruding from opposite sides of the casing, the latch bolts being depressible into the casing against the action of a spring, and in which said latch striker portion comprises first and second generally parallel wall members projecting from a surface of said mounting portion of said bracket and spaced so as to enable the latch casing to pass therebetween, the inside surface of each of said first and second wall members defining a recess in which the latch bolts are engageable to retain the closure lid in its closed position.

4. The switch of claim 3 in which the protruding ends of the latch bolts are beveled and each of said first and second wall members includes an edge that is cooperatively beveled so that, when the closure lid is closed, the latch bolts contact the beveled edges of said first and second wall members and are depressed inwardly into the latch casing.

5. The switch of claim 3 in which said bracket further includes a third wall member projecting from the surface of said mounting portion between said first and second wall members, said third wall member defining a slot that opens away from said mounting portion, and in which said movable bracket member comprises a hinge member integrally connected to said third wall member and pivotal in the slot, said hinge member being engageable by the latch casing and movable from a first to a second position in response to the closing of the closure lid.

6. The switch of claim 5 in which said hinge member connects to said third wall member of said bracket by a connecting end portion that is thinned down relative to the remainder of said hinge member to facilitate the pivotal motion of said hinge member in the slot.

7. The switch of claim 5 in which the free end of said hinge member has an I-bar shape including first and second enlarged area pads disposed on opposite sides of said third wall member for limiting the extent of motion of said hinge member.

8. The switch of claim 7 in which said third wall member defines first and second opposite sides adapted to face toward and away, respectively, from the lid latching means when said bracket is mounted and in which said first, second and third contact members are each mounted to the second side of said third wall member.

9. The switch of claim 8 in which the second portion of said second contact member includes an elongated section extending along the length of said hinge member and contacting the enlarged area pad on the second side of said third wall member and an angled extension of said elongated section which extends beyond said pad and into contact with said second portion of said third contact member when said hinge member is in its first position.

10. The switch of claim 5 in which said lamp bulb retaining portion comprises a hook shaped arm projecting from said third wall member for embracing and supporting the bulb.

11. The switch of claim 10 in which said bracket is formed as an integral unit from a plastic material.

12. The switch of claim 1 in which said movable bracket member comprises a hinge member formed as an integral part of said bracket and pivotal from a first to a second position in response to the closing of the closure lid.

13. The switch of claim 1 in which said first, second and third contact members are each formed as an integral unit from a spring metal material.

14. The switch of claim 1 in which the bulb is of the type including a bulbous portion, a base and a pair of contacts on the base that are connectable into the electrical circuit to energize the bulb and in which the second portion of said first contact member and the first portion of said third contact member are shaped for resiliently gripping and contacting the respective contacts on the base of the bulb.

15. The switch of claim 1 in which the first portion of said first contact member is formed as a terminal for connection to a voltage source in the electrical circuit.

16. The switch of claim 1 in which the first portion of said second contact member is formed as a terminal for connection to electrical ground.

17. The switch of claim 1 in which the second portion of said second contact member biases said movable bracket member into its first position.

18. A switch for mounting relative to a compartment having an access opening closable by a closure member and including means for latching the closure member in a closed position, said switch being activated between a permanent circuit-making condition and a permanent circuit-breaking condition in response to the opening and closing of the closure member, said switch comprising A. a bracket formed of an insulating material for mounting relative to the compartment and including
  i. a latch striker portion engageable by the latching means for retaining the closure member in its closed position, and
  a movable member connected to the bracket so as to be engaged by the latching means and moved from a first position to a second position where it is continuously maintained in response to the closing of the closure member;
B. a first contact member mounted to said bracket and including
  i. a first portion for connection into an electrical circuit, and
  ii. a second portion;
C. a second contact member mounted to said bracket and including
  i. a first portion for connection into an electrical circuit, and
  ii. a second portion carried by and movable with said movable member;
D. the second portions of said first and second contact members being relatively disposed so as to permanently complete the electrical circuit through said switch when said movable member is in its first position;
E. the second portion of said second contact member being movable so as to permanently break the electrical circuit through said switch when said movable member is moved to its second position.

* * * * *